Patented Mar. 27, 1945

2,372,235

UNITED STATES PATENT OFFICE 2,372,235

PRESERVING RUBBER

John R. Vincent, Wilmington, Del., assignor to
E. I. du Pont de Nemours & Company, Wilmington, Del., a corporation of Delaware No Drawing. Application February 24, 1944,
Serial No. 523,747

20 Claims. (Cl. 260—809)

This invention relates to preserving rubber and more particularly to increasing the effectiveness of antioxidants in rubber.

It has long been proposed to preserve rubber, that is, to inhibit the deterioration of rubber due to the action of light, heat and oxygen, by incorporating in the rubber various organic compounds, commonly termed antioxidants. Since the discovery of rubber antioxidants, their efficiency, that is, the degree of protection afforded rubber by their use, has been gradually improved by the discovery of new and better types of antioxidant compounds and by the use of mixtures of antioxidants. At the present time, the best results are generally obtained by mixtures of two or more compounds, each of which is effective as an antioxidant when employed by itself. While this art is rather highly developed, those skilled in the art continue to search for improved antioxidants and antioxidant compositions.

It is an object of the present invention to provide an improved method of inhibiting the deterioration of rubber. Another object is to provide a method for improving, or boosting, the efficiency of secondary aromatic amine antioxidants in rubber. A further object is to employ, with a rubber antioxidant, a compound which is not an antioxidant for rubber but which increases the efficiency of the rubber antioxidant. A still further object is to provide new and improved rubber antioxidant compositions. Other objects are to provide new compositions of matter and to advance the art. Still other objects will appear hereinafter.

The above and other objects may be accomplished in accordance with my invention which comprises incorporating in rubber a small proportion of a secondary aromatic amine antioxidant and a small proportion of a terpene mercaptan or a metal terpene mercaptide in which the metal is a metal of group II-B of the periodic table. The above and other objects may also be accomplished by mixing one of the aforesaid terpene mercaptans or metal terpene mercaptides with a secondary aromatic amine rubber antioxidant to provide a novel rubber antioxidant composition. I have found that, by the use of such mercaptans or mercaptides with a secondary aromatic amine rubber antioxidant, the antioxidant efficiency of the antioxidant is very materially increased so that much greater protection of the rubber is obtained with no increase in the amount of antioxidant and smaller amounts of antioxidant may be employed to obtain a desired amount of protection of the rubber. This was particularly surprising in view of the fact that the mercaptans and mercaptides employed are, in and of themselves, substantially ineffective as antioxidants.

The antioxidants, which may be employed in accordance with my invention, are those secondary aromatic amines which are effective by themselves to substantially inhibit the deterioration of rubber due to the action of light, heat and oxygen. It will be understood that by a secondary aromatic amine, I mean one in which both radicals attached to the nitrogen atom are aromatic radicals. A preferred class of antioxidants consists of the secondary diaryl amines which are amines in which the aromatic groups are hydrocarbon groups, that is, consist of carbon and hydrogen. Preferred antioxidants are para, para'-dimethoxy diphenylamine and the phenyl-naphthylamines.

The terpene mercaptans and the terpene mercaptides of the metals of group II-B of the periodic table are as a class effective for the purposes of my invention. Of the terpene mercaptans, pinene mercaptan will generally be preferred. Of the metal mercaptides, the zinc terpene mercaptides, and particularly zinc pinene mercaptide, are preferred.

The amount of mercaptan or mercaptide, which may be employed in accordance with my invention, may be widely varied. Preferably, I employ proportions of from about 0.01% to about 2.0% of the mercaptan or mercaptide, based on the rubber. Larger amounts may be employed if desired, but such larger amounts will generally be wasteful as no substantial improvement in results is obtained with such larger amounts. In general, the antioxidant will be employed in the proportion of about 0.2% to about 2.0% by weight of the rubber. The effectiveness of the mercaptans and mercaptides will vary somewhat with their constitution and also with the antioxidant employed. It will also generally be desirable to vary the amount of the mercaptan or mercaptide with variations in the amount of antioxidant employed. From about 0.01 part to about 2.0 parts of mercaptan or mercaptide may be employed for each part of antioxidant. Preferably, I employ from about 0.2 part to about 1.0 part of mercaptan or mercaptide to each part of antioxidant.

The mercaptan or mercaptide and the antioxidant may be added to the rubber together or separately, it being immaterial which is added first. However, I generally prefer to mix the mercaptan or mercaptide with the antioxidant to provide a rubber antioxidant composition which is to be added to the rubber.

The effectiveness of the antioxidant compositions of this invention was determined by comparing the resistance to flex-cracking of a rubber sample, containing a standard rubber antioxidant, to that of a similar sample, containing the same antioxidant plus pinene mercaptan or a metal pinene mercaptide. The resistance to flex-cracking was tested before aging and after aging in the 70° C. oxygen bomb and in the 70° C. air oven. The stock, used in all cases, was as follows, and the cure in all cases was for 60 minutes at 25 pounds per square inch steam pressure.

| | |
|---|---|
| Smoked sheet | 100 |
| Zinc oxide | 5 |
| Channel black | 50 |
| Stearic acid | 3 |
| Pine tar | 1.5 |
| Sulfur | 3 |
| Accelerator[1] | 1.25 |
| Antioxidant | 1.0 |
| Booster | 1.0 |

[1] A mixture consisting of 82% of the zinc salt of mercaptobenzothiazole, 9% of di-ortho-tolyl-guanidine and 9% inert hydrocarbon.

In the following table are listed the efficiencies of pinene mercaptan and certain metal of pinene mercaptides. The efficiency is expressed in terms of a standard antioxidant, having an efficiency of 100, that is, the antioxidant plus the booster is compared directly to the antioxidant alone.

Table

| Compound | Antioxidant [1] | Efficiency (antioxidant [1]=100) | | |
|---|---|---|---|---|
| | | Unaged | Bomb aging | Oven aging |
| Pinene mercaptan | Present | 127 | 158 | 89 |
| Do | None | 12 | 10 | 32 |
| Zinc pinene mercaptide | Present | 120 | 147 | 144 |
| Do | None | 11 | 10 | 22 |
| Cadmium pinene mercaptide | Present | 137 | 149 | 151 |
| Do | None | 11 | 10 | 22 |
| Mercury pinene mercaptide | Present | 112 | 154 | 122 |
| Copper pinene mercaptide | do | 68 | 35 | 101 |
| Silver pinene mercaptide | do | 14 | 97 | 66 |
| Lead pinene mercaptide | do | 33 | 57 | 47 |
| Cobalt pinene mercaptide | do | 50 | 56 | 42 |
| None | do | 100 | 100 | 100 |
| Do | None | 12 | 10 | 20 |

[1] The antioxidant employed was para,para'-dimethoxy diphenyl amine.

It is apparent from these data that pinene mercaptan and its zinc, cadmium and mercury mercaptides are very effective boosters for the antioxidant, although they have no antioxidant properties when used alone. It also appears that certain other salts of pinene mercaptan are not only devoid of any value as boosters, but actually destroy the antioxidant value of the antioxidant. Only those metals, which belong to group II-B of the periodic table of the elements produce mercaptides that are of value as boosters for rubber antioxidants.

It will be understood that the above tests and specific embodiments are given for illustrative purposes solely and that many variations and modifications can be made in the mercaptans, mercaptides, antioxidants and other ingredients of the rubber compositions employed without departing from the spirit or scope of my invention. Accordingly, my invention is not to be limited to the specific embodiments particularly disclosed, but I intend to cover my invention broadly as in the appended claims.

Other secondary aromatic amine rubber antioxidants, such as N-phenyl-alpha-naphthylamine, N-phenyl-beta-naphthylamine, diphenylamine, the alkoxy-diphenylamines, the alkenoxy-diphenylamines, the alkoxyphenyl - naphthylamines, the alkenoxyphenyl - naphthylamines, N,N'-diphenyl-paraphenylenediamine and N,N'-diphenylbenzidine, may be employed in place of the antioxidants used in the above tests.

Other terpene mercaptans, such as camphene mercaptan, sylvestrene mercaptan, limonene mercaptan, terpineol mercaptan, carvone mercaptan, carene mercaptan, phellandrene mercaptan, bornylene mercaptan, selinene mercaptan, fornesene mercaptan, irone mercaptan, and ionone mercaptan, and their salts with the metals of group II-B of the periodic table of the elements, may be employed in accordance with my invention. Suitable terpene mercaptans may be obtained by the reaction of the terpene with hydrogen sulfide as described in U. S. Patent 2,076,875. Also, suitable mercaptans may be obtained by sulfurizing the terpene and then subjecting the sulfurized terpene to catalytic hydrogenation over a sulfactive hydrogenation catalyst in accordance with the processes disclosed in more detail in application Serial No. 440,253, filed on behalf of Arthur L. Fox on April 23, 1942, and Serial No. 440,259, filed on behalf of J. H. Werntz on April 23, 1942. The pinene mercaptan, employed in the tests hereinabove given, was prepared by heating pinene with sulfur followed by reduction of the resulting product. The metal pinene mercaptides, employed in the tests, were derived from pinene mercaptan obtained by the sulfurization of pinene followed by reduction.

It will be apparent that, by my invention, I have discovered a class of terpene mercaptans and mercaptides which, when incorporated in rubber with a secondary aromatic amine rubber antioxidant, will very materially improve the efficiency of the antioxidant. Mixtures of the terpene mercaptans and of their mercaptides with the antioxidants constitute new rubber antioxidant compositions which are unusually and unexpectedly effective for inhibiting the deterioration of rubber. Therefore, by the practice of my invention, it is possible to obtain much greater protection of the rubber with any particular amount of secondary aromatic amine antioxidant. Also, by the use of my invention, it is possible to obtain a desired amount of protection of the rubber with materially smaller amounts of antioxidant. These results are obtained by the use of terpene mercaptans and their mercaptides which have substantially no antioxidant effect when employed by themselves, that is, in the absence of an antioxidant.

I claim:

1. The method of inhibiting the deterioration of rubber which comprises incorporating in the rubber a small proportion of a secondary aromatic amine antioxidant and a small proportion of a member of the group consisting of terpene mercaptans and metal terpene mercaptides in which the metal is a metal of group II-B of the periodic table.

2. The method of inhibiting the deterioration of rubber which comprises incorporating in the rubber a small proportion of a secondary aromatic amine antioxidant and a small proportion of a terpene mercaptan.

3. The method of inhibiting the deterioration of rubber which comprises incorporating in the rubber a small proportion of a secondary aromatic amine antioxidant and a small proportion of pinene mercaptan.

4. The method of inhibiting the deterioration of rubber which comprises incorporating in the rubber a small proportion of a secondary aromatic amine antioxidant and a small proportion of a metal terpene mercaptide in which the metal is a metal of group II-B of the periodic table.

5. The method of inhibiting the deterioration of rubber which comprises incorporating in the rubber a small proportion of a secondary aromatic amine antioxidant and a small proportion of a metal pinene mercaptide in which the metal is a metal of group II-B of the periodic table.

6. The method of inhibiting the deterioration of rubber which comprises incorporating in the rubber a small proportion of a secondary aromatic amine antioxidant and a small proportion of a zinc terpene mercaptide.

7. The method of inhibiting the deterioration of rubber which comprises incorporating in the rubber a small proportion of a secondary aromatic amine antioxidant and a small proportion of zinc pinene mercaptide.

8. The method of inhibiting the deterioration of rubber which comprises incorporating in the rubber a small proportion of a secondary diaryl amine antioxidant and a small proportion of a member of the group consisting of terpene mercaptans and metal terpene mercaptides in which the metal is a metal of group II-B of the periodic table.

9. The method of inhibiting the deterioration of rubber which comprises incorporating in the rubber a small proportion of a secondary diaryl amine antioxidant and a small proportion of pinene mercaptan.

10. The method of inhibiting the deterioration of rubber which comprises incorporating in the rubber a small proportion of a secondary diaryl amine antioxidant and a small proportion of zinc pinene mercaptide.

11. The method of inhibiting the deterioration of rubber which comprises incorporating in the rubber a small proportion of a phenyl-naphthyl-amine and a small proportion of a member of the group consisting of terpene mercaptans and metal terpene mercaptides in which the metal is a metal of group II-B of the period table.

12. The method of inhibiting the deterioration of rubber which comprises incorporating in the rubber a small proportion of para,para'-dimethoxy diphenylamine and a small proportion of a member of the group consisting of terpene mercaptans and metal terpene mercaptides in which the metal is a metal of group II-B of the periodic table.

13. The method of inhibiting the deterioration of rubber which comprises incorporating in the rubber a small proportion of para,para'-dimethoxy diphenylamine and a small proportion of a metal pinene mercaptide in which the metal is a metal of group II-B of the periodic table.

14. The method of inhibiting the deterioration of rubber which comprises incorporating in the rubber a small proportion of para,para'-dimethoxy diphenylamine and a small proportion of zinc pinene mercaptide.

15. Rubber having incorporated therein a small proportion of a secondary aromatic amine antioxidant and a small proportion of a member of the group consisting of terpene mercaptans and metal terpene mercaptides in which the metal is a metal of group II-B of the periodic table.

16. A rubber antioxidant composition comprising a mixture of 1 part of a secondary aromatic amine antioxidant and from about 0.01 to about 2 parts of a member of the group consisting of terpene mercaptans and metal terpene mercaptides in which the metal is a metal of group II-B of the periodic table.

17. A rubber antioxidant composition comprising a mixture of 1 part of a secondary aromatic amine antioxidant and from about 0.01 to about 2 parts of a terpene mercaptan.

18. A rubber antioxidant composition comprising a mixture of 1 part of a secondary aromatic amine antioxidant and from about 0.01 to about 2 parts of a metal terpene mercaptide in which the metal is a metal of group II-B of the periodic table.

19. A rubber antioxidant composition comprising a mixture of 1 part of a secondary aromatic amine antioxidant and from about 0.01 to about 2 parts of a metal pinene mercaptide in which the metal is a metal of group II-B of the periodic table.

20. A rubber antioxidant composition comprising a mixture of 1 part of a secondary aromatic amine antioxidant and from about 0.01 to about 2 parts of zinc pinene mercaptide.

JOHN R. VINCENT.